July 19, 1932.  A. E. STRINGER  1,867,775
EXPANSION MEANS FOR BELL AND SPIGOT PIPES
Filed Jan. 2, 1929   2 Sheets-Sheet 1
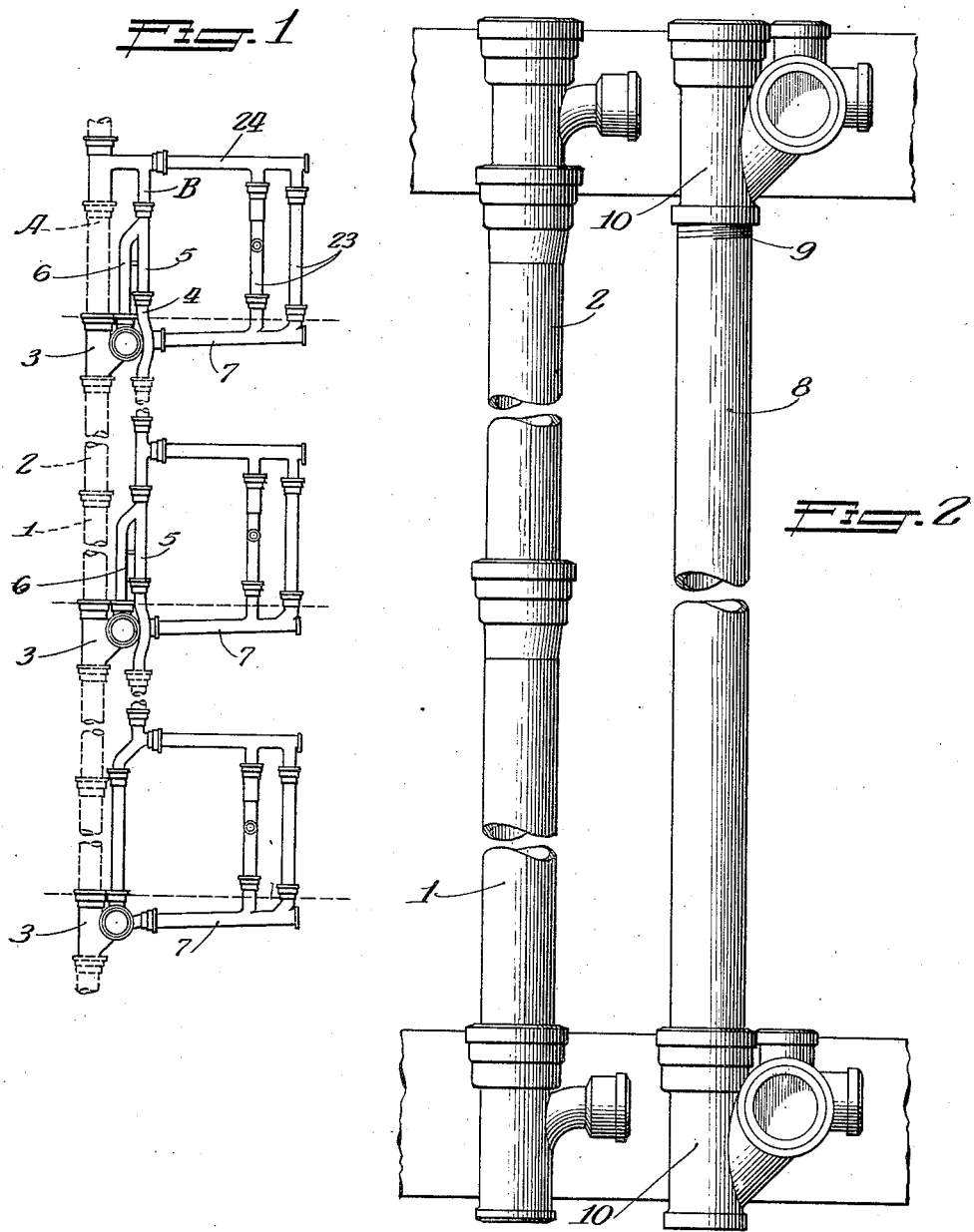
Inventor:
Alfred E. Stringer.
by: Charles Bell
Atty.

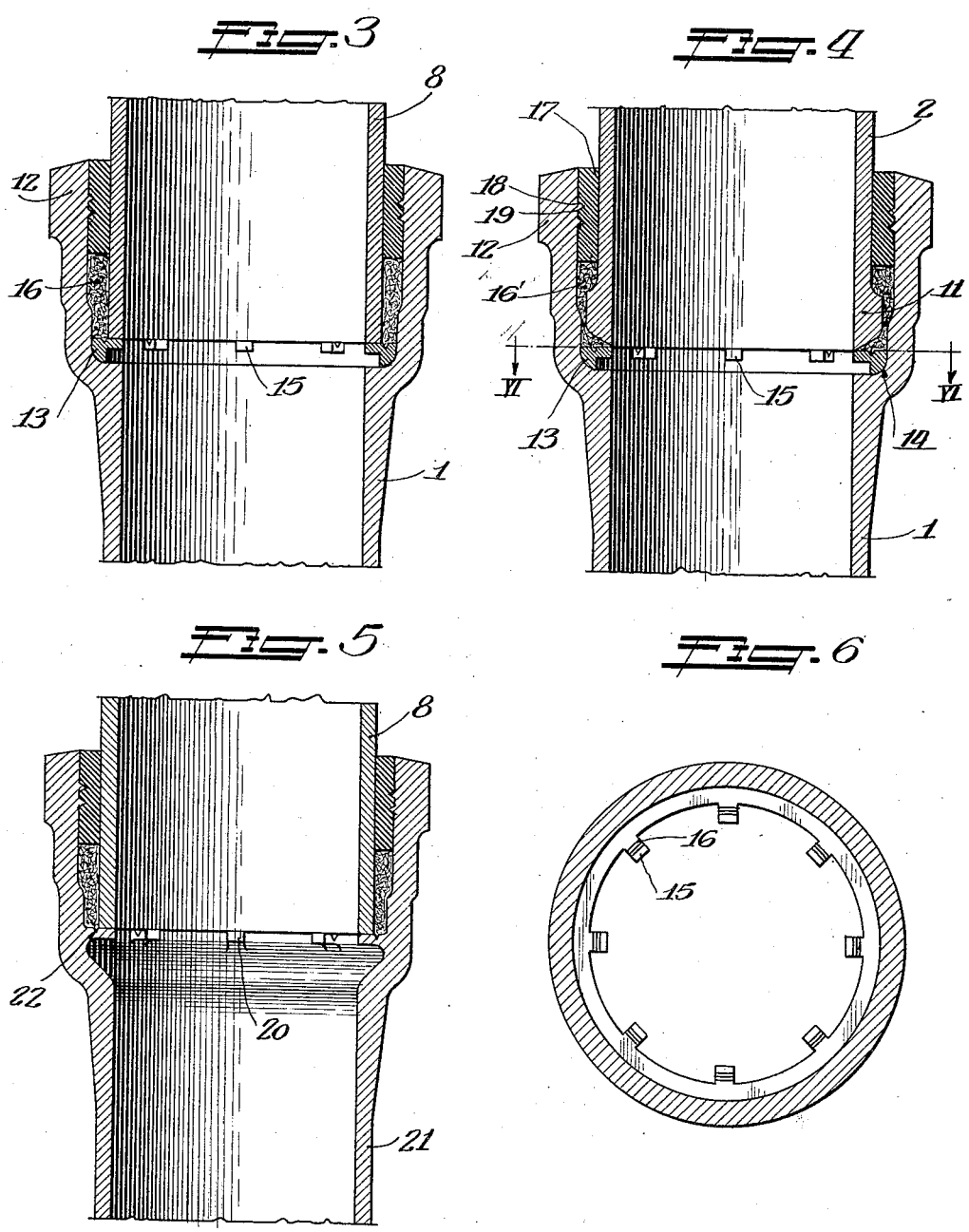

Patented July 19, 1932

1,867,775

UNITED STATES PATENT OFFICE

ALFRED E. STRINGER, OF CHICAGO, ILLINOIS

EXPANSION MEANS FOR BELL AND SPIGOT PIPES

Application filed January 2, 1929. Serial No. 329,925.

This invention relates to an expansion means for bell and spigot pipes and particularly to an arrangement whereby the pipes are spaced axially within the bells or hubs of the pipes during erection so that when the pipes are put in service, expansion and contraction of the same will be axial without any buckling of the pipes and consequent breaking or damage of the caulking material.

Pipe stacks which are used at the present time in connection with plumbing pipes and waste pipes for other purposes are supported in the completed building structure at a plurality of places in the length of the pipes so that when expansion and contraction of the pipes occur in service, especially pipes which convey hot and cold water, something must give. Sometimes the expansion causes buckling of the pipes between the points of support with the result that the pipes are moved sideways out of true position and the caulking material broken or damaged to such an extent as to allow escape of sewer or other obnoxious gases. Sometimes also the caulking material is displaced from within the bell or hub of the pipe.

An object of the present invention is to provide a joint construction for bell and spigot pipes and the like which is effective to prevent buckling of the pipes and damage to the caulking material.

Another object of the invention is to provide a locking of the caulking material within the bells of the pipes.

A further object of the invention is to provide joints in bell and spigot pipe lines wherein movement of the pipes under expansion and contraction is axial and not lateral and in which the caulking material is secured against bodily displacement.

A still further object of the invention is to provide means for spacing pipe sections in a bell and spigot pipe line construction wherein movement due to expansion and contraction is restricted to movement axially and not laterally and in which damage to the caulking material is eliminated.

The above, other and further objects of the invention will be apparent from the following description, accompanying drawings and appended claims.

An embodiment of the invention is illustrated in the accompanying drawings and the views thereof are as follows:

Figure 1 is a side elevational view somewhat fragmental in form of a soil and ventilating pipe construction for plumbing fixtures, there being plumbing connections for three stories illustrated.

Figure 2 is a side elevational view somewhat fragmental in character of two pipe stacks embodying the present invention.

Figure 3 is a fragmental sectional view through a bell and spigot pipe joint construction embodying this invention. The spigot pipe of Figure 3 is made without any external flange at the lower end of the pipe where the same enters the bell of the next adjacent section.

Figure 4 is a view similar to Figure 3 showing an annular ring formed on the outer end of the spigot pipes.

Figure 5 is a view similar to Figure 3 showing the expansion ring as being formed integrally with the bell pipe.

Figure 6 is a section taken on line VI—VI of Figure 4.

As shown on the drawings:

This invention is especially useful in connection with pipe stacks for plumbing fixtures used in building construction which stacks are constructed sometimes in advance of the building construction and often times are supported temporarily at least until the permanent building structure is erected.

Pipe stacks for plumbing fixtures are subjected to wide ranges of temperature variation due to the waste water from bath tubs, wash basins, lavatories, and the like, resulting in extreme expansion and contraction of the pipes in service. Heretofore pipe stacks used for plumbing fixtures buckle at the joints under expansion causing the caulking material such as lead to loosen or crack and eventually creep upwardly out of the bells or hubs of the pipes allowing seepage of sewer gas or water to leak at these joints which leakages of course are highly undesirable.

This invention is directed to the provision of an expansion joint in a bell and spigot pipe lines wherein the spigot pipe is spaced axially from the shoulder of the bell during erection of the pipe line. The expansion means being such as to be movable out of the way of the supported spigot pipes when pipes expand in service. Furthermore, the invention contemplates the locking of the caulking material in the bell or hub of the pipe to prevent bodily displacement of the caulking material. The invention therefore results in axial movement of the pipes in expansion and contraction without any lateral displacement of the same so that damage to the caulking material is eliminated.

Figure 1 shows somewhat diagrammatically in form a soil pipe A made up of a plurality of bell and spigot pipe sections 1 and 2 with the usual connector 3 at the various floor levels for connection with suitable plumbing fixtures.

The ventilating stack B comprises a plurality of similar bell and spigot pipes 4 and 5 connected with branches 6 into the connectors 3 for ventilating the same as is standard practice.

Lateral soil pipes 7 are arranged in connection with the connectors 3 for communication with bath tubs, wash basins, and the like. The connectors 3 are provided with the usual connection for toilets.

Figure 2 discloses two pipe stacks, the one at the left comprising bell and spigot pipe sections 1 and 2 of cast iron or similar cast metal, while the one at the right discloses a pipe 8 which is threaded at its upper end as at 9 for threaded engagement with a fixture or connector 10.

Figure 4 is a section through a pipe joint comprising a cast metal pipe 1 and a cast metal pipe 2, the pipe 2 being referred to herein as the spigot pipe. The pipe 2 has an annular collar 11 passed about the lower end of the same for entering within the bell or hub 12 of the pipe 1.

An expansion member shown in Figure 4 as comprising a ring 13 is placed within the hub 12 engaging the shoulder 14 of said hub.

The ring 13 has a plurality of short inwardly or centrally directed lugs or fingers 15 which lugs are notched at 16 for a purpose to be hereinafter described. The lower end of the spigot pipe 2 rests on the extremities of the lugs 15 while the pipe stack is being installed. The ring 13 therefore supports the pipe 2 in spaced relation to the shoulder 14 of the bell pipe 1.

Caulking material 16' such as mineral, wool, or the like, is then spaced within the bell 12 about the lower end of the spigot pipe 2. Other caulking material, such as lead 17, is then run into the upper end of the bell 12 sealing the joints between the bell 12 and the spigot pipe 2. The inner surface of the upper portion of the bell 12 is provided as shown in Figure 4 with an annular ring 18 and an annular channel 19 so that the lead or other caulking material 17 run into the upper end of the bell will when cold be securely locked in the bell 12 against bodily displacement.

The strength of the fingers or lugs 15 of the expansion ring 13 is such as to support the various pipe sections in the stack during erection of the stack. It is understood that the pipe stack is temporarily supported in the building structure no matter of what the building structure is composed and when secured permanently in place, the stacks are fastened at various points in the length of the same in the building structure.

Heretofore when the pipe stacks have been so secured in permanent position, expansion due to variation of temperatures of the waste material passing through the stands has caused expansion which forces the pipes laterally at the joints thus breaking the lead caulking or causing the lead caulking to move outwardly of the bell thus exposing the joints to the escape of sewer gas and waste water, or the like.

An expansion member such as ring 13 spaces a spigot pipe 2 when the same is installed so that when expansion takes place, the spigot pipe 2 will move axially relatively to the bell pipe 1 bending or otherwise displacing the outer ends of the lugs 15 thus eliminating all lateral movement of the pipes. The caulking material 17 being locked within the bell 12 in the manner before described will retain the caulking material against displacement as the pipes 1 and 2 move relatively to each other under expansion and contraction so that at all times a leak tight joint is provided.

Figure 3 shows the arrangement of the parts when the threaded pipe 8 is inserted in a bell pipe 1 or inserted in the upper end of one of the connectors 10 as in the latter instance an expansion member, such as ring 13 would be utilized.

Figure 5 shows the projections 20 cast integrally with a bell pipe 21. The projections 20 are notched at 22 similarly to projections 15 heretofore described so that when the pipes 21 and 8 move relatively to each other, the lugs 20 will be displaced to allow axial movement of the pipes without causing lateral and destructive movements of the same.

The arrangement of the packing materials 16 and 17 as described with reference to Figure 4 apply likewise to Figures 3 and 5.

The depth of the packing ring 13 and the arrangement of the integral fingers or lugs 20 is such as to allow maximum axial movement between the pipes joined in the manner herein described and may be bent downwardly out of the path of movement of the spigot pipe or may be broken off and fall to the lower end of the pipe 10.

The material of which the ring 13 is made may be of breakable or yieldable material for accomplishing the purposes intended. The pipe stacks are erected before being permanently fastened in the structure, hence it is necessary to space the bell and spigot pipes as heretofore described when the stacks are erected as the caulking has to be done before the pipe stacks can be permanently fastened in place.

Expansion and contraction of the pipes of course does not take place until after the building is completed and the hot and cold water turned into the pipes.

The expansion joints herein described are useful to take care of any settling of the building after construction, as every building no matter what its character, is subject to settling to some extent.

It will be observed that the expansion member herein described allows proper spacing of the pipe forming the joint during the erection of the pipe stacks which expansion or spacing element is rendered ineffective after the pipes are put in service by the expansion of the pipes bending or breaking off the supporting lugs.

The pipes have been referred to herein as bell and spigot pipes, although it is to be understood that this construction applies to any form of pipe stacks, or lines, even though the interfitting pipe is not provided with the annular shoulder 11 or spigot so called as shown in Figure 4 and where the term spigot has been used, it has been used generally and not by way of limitation and the claims are accordingly to be construed with respect to this meaning.

It is furthermore to be understood that I do not limit the caulking material to lead as any suitable material for this purpose may be employed with equally successful result as far as the expansion and contraction of the connected pipes is concerned.

The packing material which may be employed for packing the spigot pipe in the bell of the bell pipe may consist of oakum 16 and caulked lead 17. Such a seal will allow longitudinal movement of the pipes.

It has been found that the plumbing pipes in large buildings have been affected by the vibrations imparted to the building through wind storms and in fact even by heavy elevators operating in the buildings. The expansion joints of this invention readily protect the plumbing pipes from breakage at the joints.

The lateral waste pipes 7 have branch waste pipes 23 connected to the same or in association with other fixtures. The branch waste pipes 23 are connected by vent pipes 24 with the ventilating stacks B, the joints between the waste pipes 23 and the lateral waste pipes 7 are expansion joints as well as the joints in the ventilating stack B.

The invention has been described herein more or less precisely, yet it is to be understood that changes may be made in the arrangement and proportion of parts and that equivalents may be substituted, all without departing from the spirit and scope of the invention.

The invention is claimed as follows:

1. A pipe stack including bell and spigot pipe sections arranged end to end, means within a bell portion of a pipe for supporting the end of an adjacent pipe section in spaced relation within the bell, said means including a plurality of inwardly extending projections for underlying the end of the supported pipe, said projections being movable out of the way of the supported pipe by said supported pipe when the same is moved axially by expansion.

2. A pipe stack comprising a plurality of pipe sections having bells at the upper ends of the sections, said bells receiving the other ends of the adjacent pipe sections, an expansion ring within a bell having centrally directed lugs for temporarily supporting the adjacent pipe section in spaced relation within the bell, said lugs being breakable when said pipe section moves axially under expansion.

3. An expansion joint for pipes comprising a bell mouthed socket, means within said bell mouthed socket for temporarily supporting a length of pipe, said means including a plurality of inwardly projecting lugs for underlying the supported pipe, said lugs being moved away from underneath said supported pipe by said supported pipe as the same moves axially with respect to the bell mouthed socket under expansion, and permanent sealing means in said socket around said pipe arranged to allow longitudinal movement of said pipes, said sealing means being locked within said socket.

4. An expansion joint for a pipe stack including a socket, and a pipe, and a plurality of lugs integral with the socket extending towards the axis thereof for temporarily receiving and supporting the pipe therein and for spacing the same axially within the socket, said lugs being removable out of the path of the said pipe by the pipe itself when the same moves axially under expansion.

5. An expansion joint for a pipe stack comprising a bell mouthed pipe socket having an interior shoulder, a ring supported by said shoulder, said ring having a plurality of lugs extending towards the center thereof for temporarily supporting thereon an upstanding pipe stack during construction, said lugs being movable out of the way of the supported pipe when said pipes move relatively axially under expansion.

In testimony whereof I have hereunto subscribed my name at Chicago, Cook County, Illinois.

ALFRED E. STRINGER.